United States Patent
Mitra et al.

(10) Patent No.: US 9,104,616 B1
(45) Date of Patent: *Aug. 11, 2015

(54) SYSTEM AND METHOD FOR MAINTAINING CONSISTENT POINTS IN FILE SYSTEMS

(71) Applicant: EMC Corporation, Hopkinton, MA (US)

(72) Inventors: Soumyadeb Mitra, San Jose, CA (US); Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,363

(22) Filed: Jul. 24, 2014

Related U.S. Application Data

(63) Continuation of application No. 13/077,795, filed on Mar. 31, 2011, now Pat. No. 8,832,394.

(51) Int. Cl.
    *G06F 3/00* (2006.01)
    *G06F 11/00* (2006.01)
    *G06F 11/14* (2006.01)
    *G06F 17/30* (2006.01)
    *G06F 3/06* (2006.01)

(52) U.S. Cl.
    CPC ...... *G06F 11/1435* (2013.01); *G06F 17/30156* (2013.01); *G06F 3/065* (2013.01); *G06F 3/067* (2013.01); *G06F 3/0647* (2013.01)

(58) Field of Classification Search
    None
    See application file for complete search history.

(56) References Cited

U.S. PATENT DOCUMENTS

| | | | |
|---|---|---|---|
| 7,430,570 B1 | 9/2008 | Srinivasan et al. | |
| 7,584,338 B1 | 9/2009 | Bricker et al. | |
| 2004/0030727 A1* | 2/2004 | Armangau et al. | 707/200 |
| 2004/0039888 A1 | 2/2004 | Lecrone et al. | |
| 2004/0133575 A1 | 7/2004 | Farmer et al. | |
| 2004/0260673 A1 | 12/2004 | Hitz et al. | |
| 2005/0182797 A1 | 8/2005 | Adkins et al. | |
| 2006/0080370 A1* | 4/2006 | Torii et al. | 707/204 |
| 2006/0195493 A1 | 8/2006 | Chang et al. | |
| 2006/0218364 A1 | 9/2006 | Kitamura | |
| 2008/0005198 A1 | 1/2008 | Cobb | |
| 2008/0016115 A1 | 1/2008 | Bahl et al. | |

(Continued)

OTHER PUBLICATIONS

Non-Final Office Action, U.S. Appl. No. 13/077,790, dated Jul. 22, 2014, 9 pages.

(Continued)

*Primary Examiner* — Cheng-Yuan Tseng
*Assistant Examiner* — Craig Goldschmidt
(74) *Attorney, Agent, or Firm* — Blakely, Sokoloff, Taylor & Zafman LLP

(57) ABSTRACT

According to one embodiment, in response to a request to write a prime segment of a file system of a storage system, one or more of the storage units are identified based on a prime segment write-map (PSWM). The PSWM includes storage unit identifiers (IDs) identifying the storage units to which a new prime segment should be written. The prime segment is then written in the one or more storage units identified from the PSWM, without writing the prime segment to a remainder of the storage units. The first prime segment is one of a plurality of prime segments collectively representing a prime. The prime contains metadata representing a consistent point of data stored in the file system, including a reference to a root of the file system. The first prime segment can be utilized to restore the file system back to a state represented by the consistent point.

24 Claims, 17 Drawing Sheets

(56) References Cited

U.S. PATENT DOCUMENTS

| | | | |
|---|---|---|---|
| 2008/0162590 | A1 | 7/2008 | Kundu et al. |
| 2008/0162662 | A1 | 7/2008 | Fujita et al. |
| 2008/0270729 | A1 | 10/2008 | Reddy et al. |
| 2010/0246578 | A1 | 9/2010 | Zhong et al. |
| 2010/0313040 | A1 | 12/2010 | Lumb |
| 2010/0332452 | A1 | 12/2010 | Hsu et al. |
| 2011/0047132 | A1 | 2/2011 | Kilday et al. |
| 2011/0167221 | A1* | 7/2011 | Pangal et al. ............ 711/117 |
| 2012/0072394 | A1 | 3/2012 | Joshi et al. |
| 2012/0197845 | A1 | 8/2012 | Kim et al. |

OTHER PUBLICATIONS

International Search Report and Written Opinion, Application No. PCT/US2012/028035, dated Jun. 22, 2012, 9 pages.

Non-Final Office Action, U.S. Appl. No. 13/077,784, dated Jul. 17, 2012, 9 pages.

Final Office Action, U.S. Appl. No. 13/077,784, dated Nov. 20, 2012, 14 pages.

Non-Final Office Action, U.S. Appl. No. 13/077,790, dated Nov. 30, 2012, 10 pages.

Non-Final Office Action, U.S. Appl. No. 13/077,790, dated May 9, 2013, 10 pages.

Notification Concerning Transmittal of International Preliminary Report on Patentability, Application No. PCT/US2012/028035, mailed Oct. 10, 2013, 9 pages.

Non-Final Office Action, U.S. Appl. No. 13/077,795, dated Oct. 16, 2013, 18 pages.

Final Office Action, U.S. Appl. No. 13/077,790, dated Oct. 21, 2013, 12 pages.

Notice of Allowance, U.S. Appl. No. 13/077,795, dated May 8, 2014, 13 pages.

Non-Final Office Action, U.S. Appl. No. 13/077,784, dated Nov. 4, 2014, 9 pages.

Final Office Action, U.S. Appl. No. 13/077,790, dated Jan. 8, 2015, 12 pages.

* cited by examiner

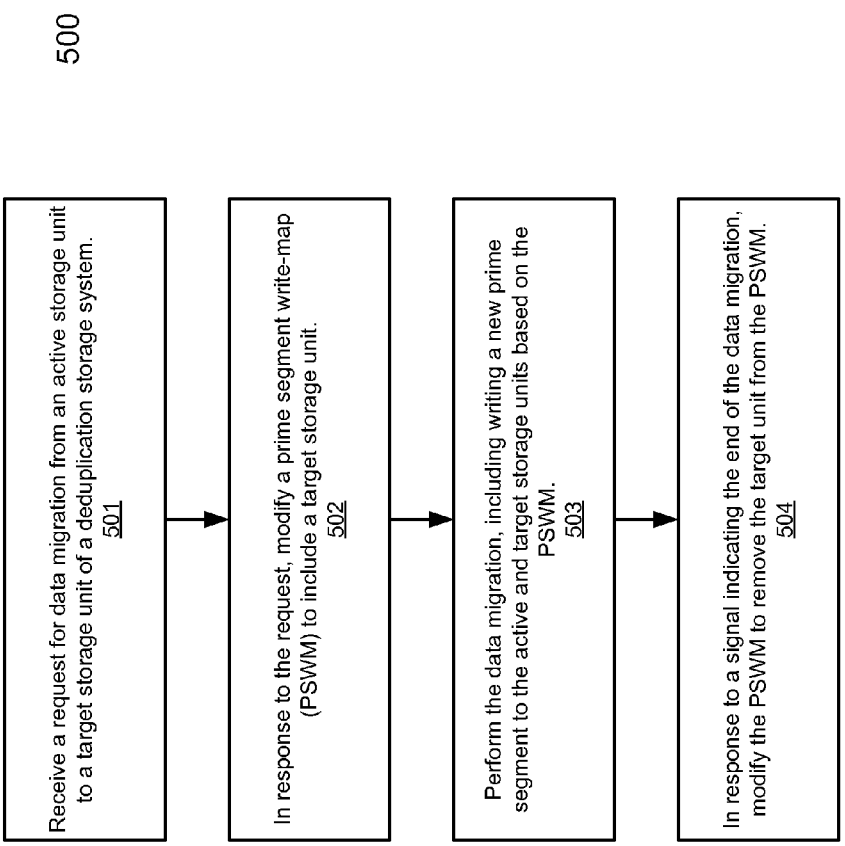

US 9,104,616 B1

SYSTEM AND METHOD FOR MAINTAINING CONSISTENT POINTS IN FILE SYSTEMS

RELATED APPLICATIONS

This application is a continuation of U.S. patent application Ser. No. 13/077,795, filed Mar. 31, 2011, which is related to U.S. patent application Ser. No. 13/077,790, filed Mar. 31, 2011 and U.S. patent application Ser. No. 13/077,784, filed Mar. 31, 2011. The disclosure of the above-identified applications is incorporated by reference herein in its entirety.

FIELD OF THE INVENTION

Embodiments of the present invention relate generally to file systems of a storage system. More particularly, embodiments of the invention relate to maintaining consistent points of file systems.

BACKGROUND

Driven by an ever increasing data growth and the advent of new workloads like disk-based backups, there is a strong demand for designing and building large file systems. Scaling file system capacity is a difficult problem, particularly for de-duplicated systems because of their large memory and central processing unit (CPU) processing requirements. To address the scaling problem, partitioning architectures have been proposed where a file system is divided into multiple partitions. Partitioning a file system introduces a problem of presenting a consistent view of the data.

An approach used in a traditional log structured file system involves periodically check-pointing the file system by flushing all dirty data and then appending a special token to mark the log head. The special token is referred to herein as a prime segment or prime. A prime segment marks a consistent view of the file system. In case of a system crash or restart, the file system can be reverted back to the state marked by the prime segment. A "consistency point" is a file system state which gives a valid view of the data. There can be multiple definitions of consistency; throughout this application, it is referred to as "reference consistency" which means that the file system root should not have dangling references. That is, any data or metadata pointed to by the root should be available.

In case of multi-partition file systems, one possible approach is to write a prime segment to all the partitions to mark a consistent view across the partitions. However, this approach may not be appropriate when the partitions are not symmetric. For example, if some partitions are read-only or are unavailable at the time, the primes segment cannot be written to and read from those partitions. In addition, every time when a new prime segment is to be written, it may take a longer time to write such a prime segment to every storage units and more storage space is required to store the prime segments over time in each storage unit. Furthermore, when the storage system starts up, each prime segment stored in each storage unit has to be verified. As a result, each storage unit has to be powered up and initialized, which takes a relatively long time.

BRIEF DESCRIPTION OF THE DRAWINGS

Embodiments of the invention are illustrated by way of example and not limitation in the figures of the accompanying drawings in which like references indicate similar elements.

FIG. 5 is a flow diagram illustrating a method for maintaining a consistent point of a file system according to another embodiment of the invention.

DETAILED DESCRIPTION

Figure 1:
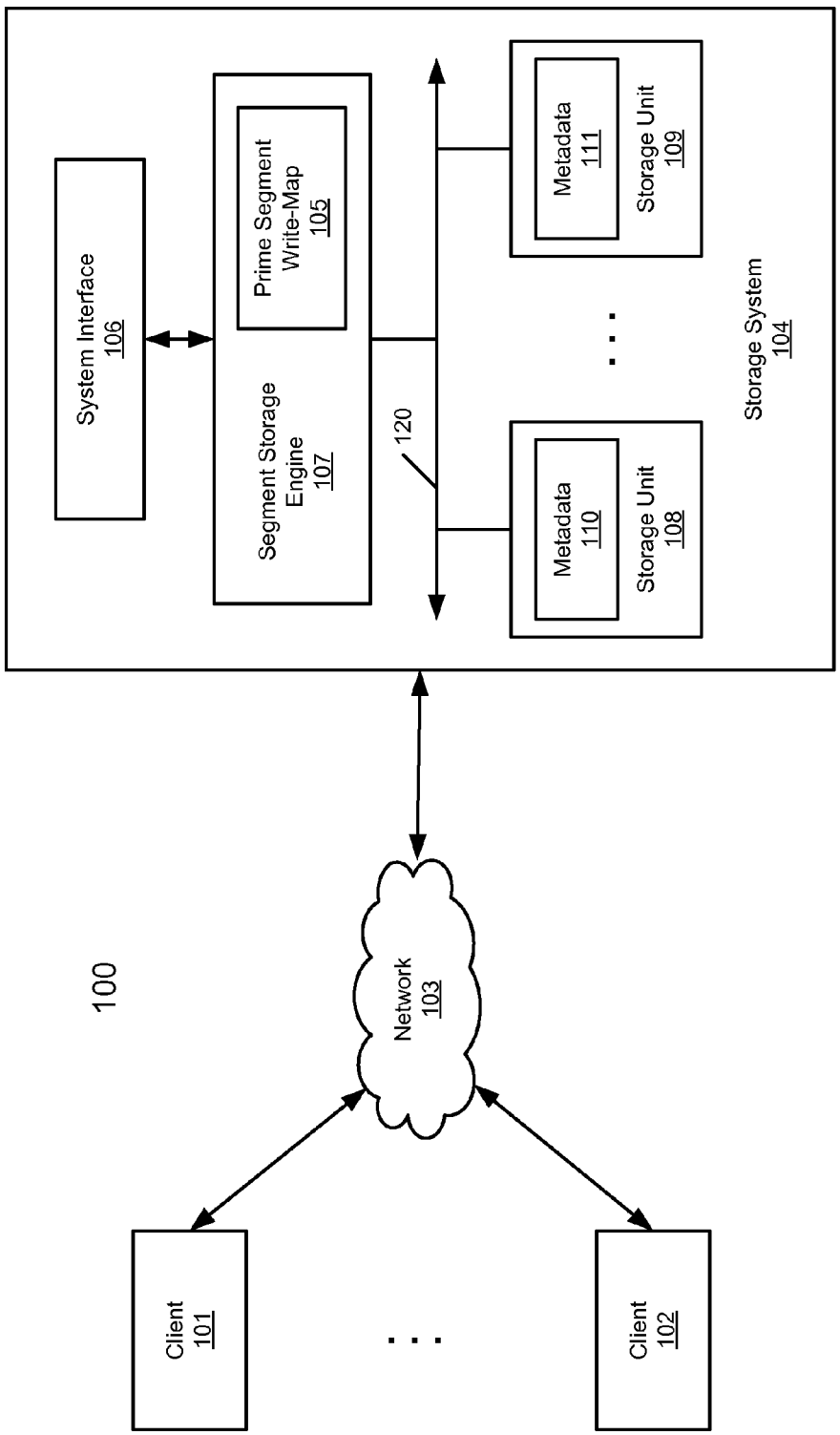
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a new prime segment may not need to be written in each storage unit. Rather, the new prime segment may be written to some of the storage units that are affected. For example, in a deduplicated storage system having an active storage unit, a target storage unit, and one or more sealed archive storage units, a new prime segment may be written to the active storage unit and/or target storage unit, without having to write the new prime segment to rest of the archive storage units. In one embodiment, a prime segment write-map (PSWM) is maintained to contain information indicate which of storage units of a storage system to which a next prime segment is to be written. That is, instead of writing the new prime segment to every storage units, the new prime segment is only written to one or more storage units that are specified in the PSWM.

During normal operations, external user data (e.g., fresh user data) is typically written to an active storage unit. During a data migration process in which data is migrated (e.g., archived) from the active storage unit (e.g., a first storage unit) to a target storage unit (e.g., a second storage unit), data is written to both the active and target storage units. In order to capture the inter-dependency of data between the active storage unit (e.g., a first file partition) and the target storage unit (e.g., a second file partition), the associated prime segment must be written to both the active and target storage units. According to one embodiment, prior to starting the data migration, the PSWM is modified to include storage unit identifiers (IDs) that identify at least the active storage unit and the target storage unit, such that the corresponding prime segment is written to both the active and target storage units. After the data migration, the PSWM is modified again to only include the storage unit ID of the active storage unit, such that a subsequent prime segment will be written to the active storage unit.

In addition, according to one embodiment, a prime is represented by one or more prime segments, each being stored in one of the storage units of a storage system. Each of the prime segments is identified by a prime segment ID that uniquely identifies the prime segment in its corresponding storage unit. In one embodiment, a prime segment ID is represented by a sequence number that is sequentially incremented whenever a new prime is generated. The prime for the entire file system may be construed by one or more prime segments having dependency relationships among them. In one embodiment, a prime dependency list is maintained in at least one of the storage units (e.g., active storage unit), where the prime dependency list includes information (e.g., prime segment IDs) identifying one or more prime segments that together collectively represent the corresponding prime. The prime dependency list further includes storage unit IDs that identify the storage units associated with the prime segments. As a result, unlike conventional multi-node storage systems, a prime segment does not always need to be read from every storage unit. Rather, one can walk through the prime dependency list to identify all the necessary prime segments to determine an installable prime, which in turn can be used to construct a consistent point of the file system. An installable prime segment represents the most recent file system consistent point.

Furthermore, according to one embodiment, the latest known installable prime that has been verified is cached in at least one of the storage units (e.g., active storage unit) of the storage system. Subsequently, when there is a need to verify if latest prime is installable, the dependency list of the latest prime is compared with the dependency list of the last verified prime. Only the prime segments that have not been verified previously require verification. That is, if a prime segment in the latest prime's dependency list exists in the last verified prime's dependency list, that prime segment need not be verified. Only those prime segments that do not exist in the last verified prime's dependency list need to be verified. As a result, the verification process can be performed in a quicker manner and the uninvolved storage units may not be powered up.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a de-duplication storage system available from EMC® Corporation of Hopkinton, Mass.

In one embodiment, storage system 104 includes, but is not limited to, system interface 106, segment storage engine 107, and one or more storage units 108-109 communicatively. A file system of storage system 104 may be partitioned into multiple file system partitions, where each of the file system partitions may be stored in one of storage units 108-109. Storage units 108-109 may be implemented locally (e.g., single node operating environment) or remotely (e.g., multi-node operating environment) via interconnect 120, which may be a bus or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, segment storage engine 107 is configured to segment the data file into multiple segments according to a variety of segmentation policies or rules. Segment storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. In addition, metadata 110-111 is added to at least some of storage units 108-109, such that files can be accessed independent of another storage unit. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compressions (e.g., main or active storage unit from other storage units, one storage unit from another storage unit, etc.).

Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

In one embodiment, storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, in order to maintain a consistent point of a file system of storage system 104, a prime segment must be maintained within storage system 104. Amongst other things, a prime contains a reference to the file system root which is used for bringing up the file system and accessing files stored in it. Conventional systems typically store the latest prime segments to each of storage units 108-109, which is time consuming and requires more storage space. In one embodiment, segment storage engine 107 maintains PSWM 105 having information identifying which of storage units 108-109 to which a next prime segment is to be written as part of metadata 110-111. That is, instead of writing the new prime segment to every storage units, the new prime segment is only written to one or more storage units that are specified in PSWM 105.

In addition, according to one embodiment, a prime dependency list (not shown) is maintained in at least one of the storage units (e.g., a prime segment of an active storage unit), where the prime dependency list includes information (e.g., prime segment IDs) identifying one or more prime segments that together collectively represent the corresponding installable prime. Furthermore, according to one embodiment, the latest known installable prime that has been verified is cached in at least one of the storage units (e.g., active storage unit) of the storage system. Subsequently, when there is a need to verify if the latest prime is installable, the prime segments in the latest prime's dependency list are compared with the prime segments of the last verified prime's dependency list. Only the prime segments that have not been verified previously require verification.

Figure 2:
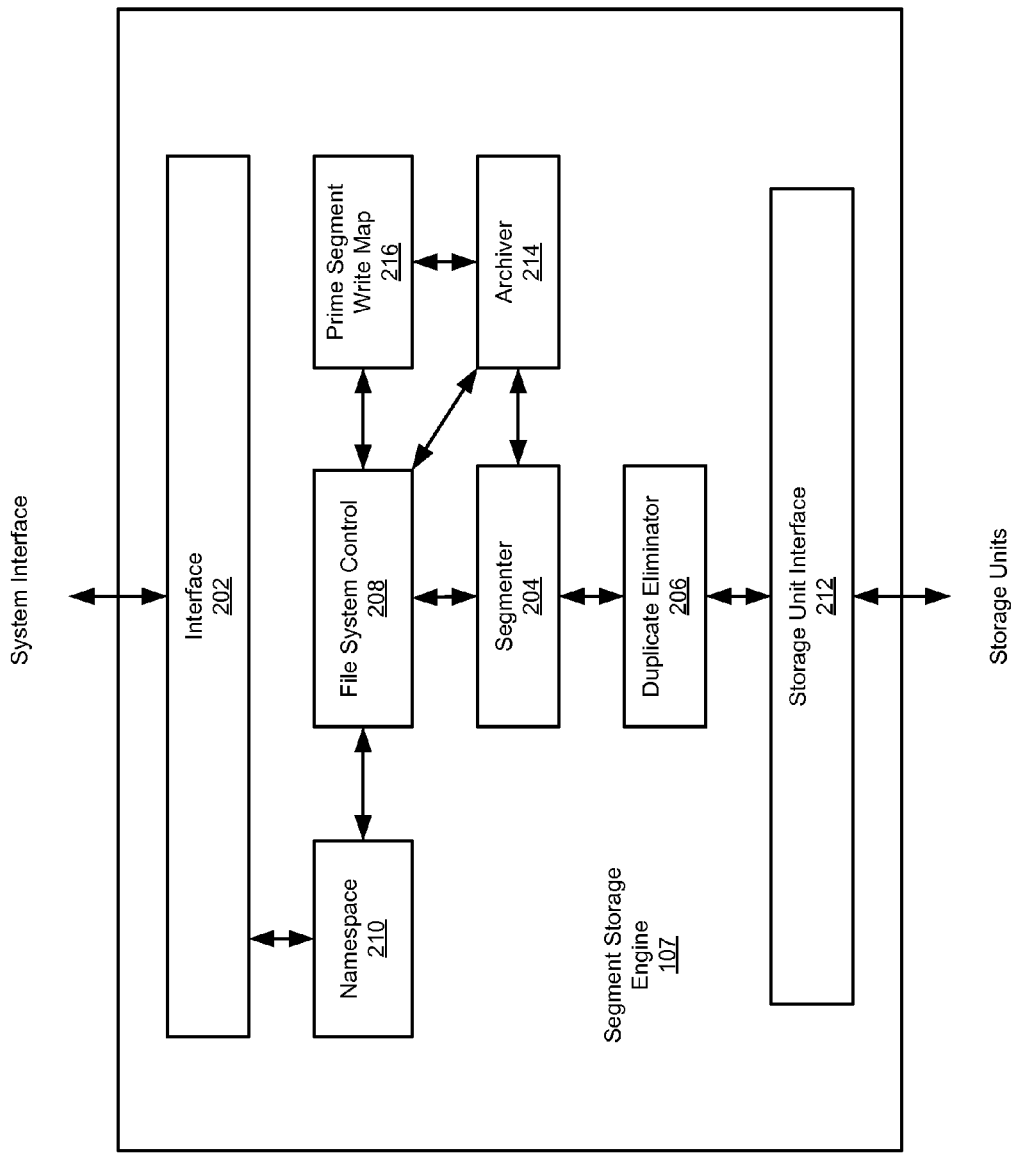
FIG. 2 is a block diagram illustrating a segment storage engine according to one embodiment of the invention.

FIG. 2 is a block diagram illustrating a segment storage engine according to one embodiment of the invention. Note that for purposes of illustration only, certain reference numbers for certain components having the same or similar functionalities from the previous figures or description may be retained the same. Referring to FIG. 2, in one embodiment, segment storage engine 107 includes interface 202, segmenter 204, duplicate eliminator 206, file system control 208, namespace 210, and storage unit interface 212. Segment storage engine 107 receives data item(s) via interface 202 and namespace 210. In an operating system, an example of namespace is a directory. Each name in a directory uniquely identifies one file or subdirectory, but one file may have the same name multiple times. The data item(s) or file(s) is/are processed by segmenter 204 and file system control 208. Segmenter 204 breaks the data item(s) into segments based on a variety of rules or considerations. For example, the data item(s) may be broken into segments by identifying segment boundaries using a content-based technique (e.g., a function is calculated at various locations of a data item, when the function is equal to a value or when the value is a minimum, a maximum, or other value relative to other function values calculated for the data item), a non-content-based technique (e.g., based on data item property for example, byte length, title, creation date), or any other appropriate technique. In one embodiment, a segment is restricted to a minimum and/or maximum length, to a minimum or maximum number of segments per data item, or any other appropriate limitation.

In one embodiment, file system control 208 processes information to indicate the segment(s) association with a data item. In some embodiments, a list of fingerprints is used to indicate segment(s) associated with a data item. File system control 208 passes segment association information to an index (not shown). The index is used to locate stored segments in storage unit(s) via storage unit interface 212. Duplicate eliminator 206, which identifies whether a newly received segment has already been stored in storage unit(s). In the event that a segment has already been stored in storage unit(s), a reference to the previously stored segment is stored instead of storing the newly received segment.

Interface 202 is configured to receive a request to retrieve a data item. Interface 202 communicates with file system control 208 via namespace 210 to identify appropriate segments stored in storage units via storage unit interface 212. File system control 208 communicates with an index (not shown) to locate appropriate segments stored in storage units via storage unit interface 212. Appropriate segments are used to construct the requested data item. The data item is provided via interface 202 in response to the request. In one embodiment, file system control 208 utilizes a tree of content-based identifiers (e.g., fingerprints) to associate a file with data segments and their locations in storage unit(s). In the event that a segment associated with a given file or data item changes, the content-based identifiers will change and the changes will ripple from the bottom to the top of the tree associated with a file name (or directory structure) efficiently since the appropriate content-based identifiers are easily identified using the tree structure.

According to one embodiment, segment storage engine 107 includes archiver 214 configured to archive data from an active storage unit to a target storage unit, and to maintain a consistent point for file system 208 by storing appropriate prime segments to the storage units such as storage units 108-109. In one embodiment, PSWM 216 is utilized to indicate which one or more of storage units 108-109 to which a next prime segment is to be written, without having to write the same prime segment to rest of the storage units, which is more time consuming and requires more storage space. PSWM 216 may be implemented as a part of PSWM 105 of FIG. 1. During normal operations, PSWM 216 contains a reference pointing to an active storage unit, as user data is typically written to the active storage unit. A subsequently prime segment will only be written to the active storage unit. During data migration from the active storage unit to a target storage unit, PSWM 216 contains references pointing to both the active and target storage units, as the data stored in both the active and target storage unit has dependency relationships. A subsequent prime segment will be written to both the active and target storage units. Note that some or all of the components as shown in FIGS. 1-2 may be implemented in software, hardware, or a combination of both.

Figure 3A:
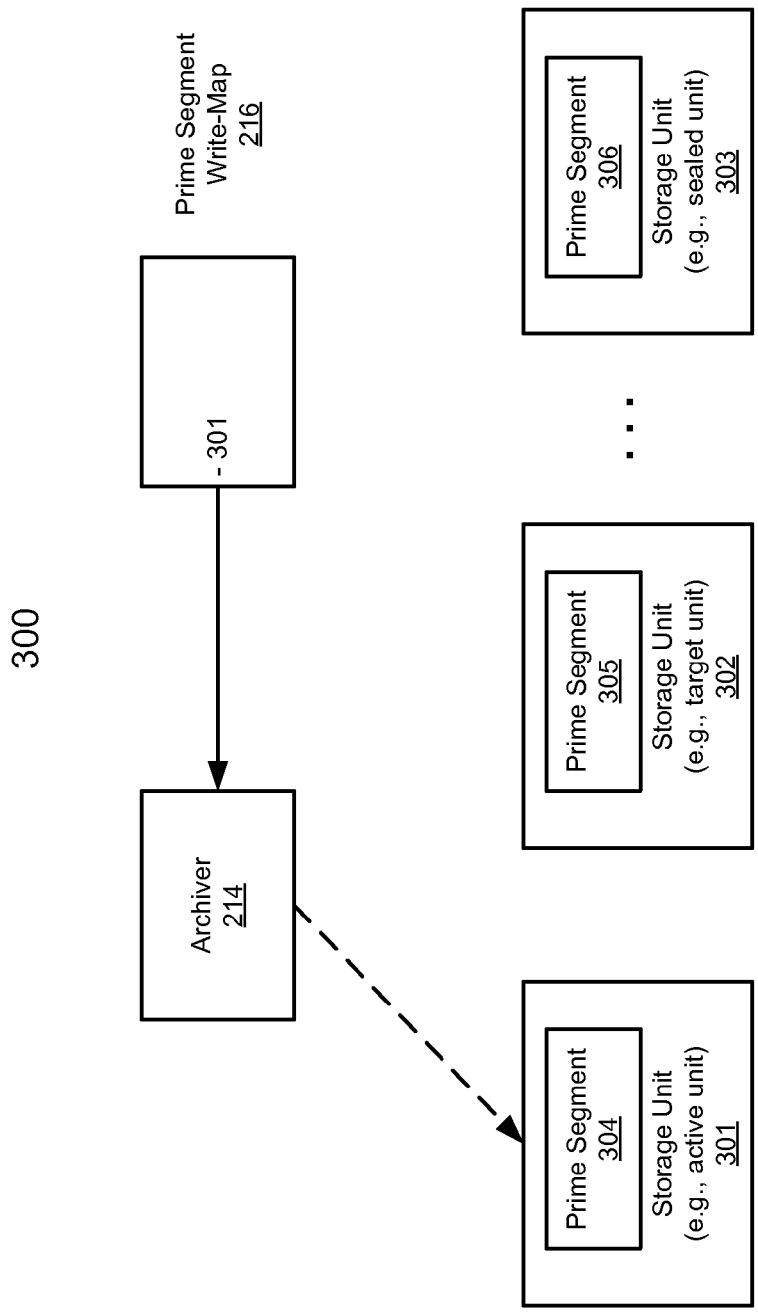
FIGS. 3A and 3B are block diagrams illustrating usage of a prime segment write-map in a storage system according to one embodiment of the invention.
Figure 3B:
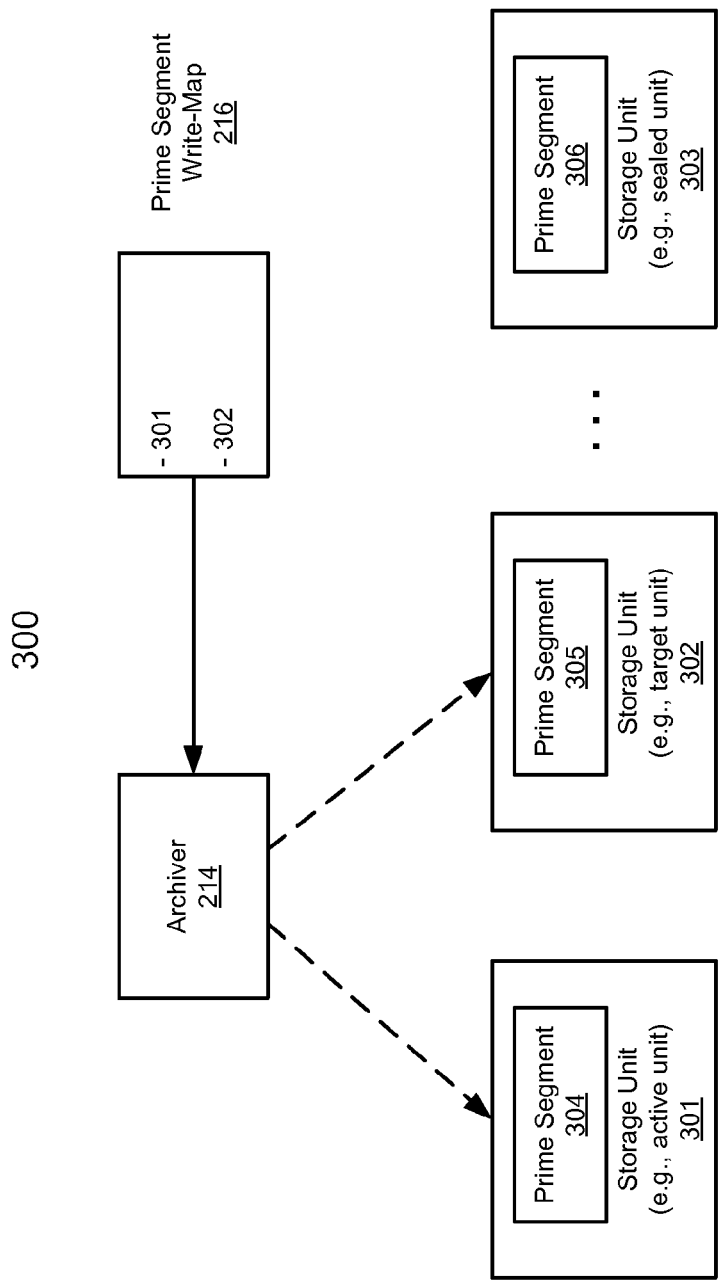

FIGS. 3A and 3B are block diagrams illustrating usage of a prime segment write-map in a storage system according to one embodiment of the invention. For example, system 300 may be implemented as part of storage system 104 of FIG. 1. Referring to FIGS. 3A-3B, storage units 301-303 may represent at least part of storage units 108-109 of FIG. 1. Storage units 301-303 may be implemented within a single computing node or in multiple computing nodes over a network. Each of storage units 301-303 is identified by a storage unit ID that uniquely identifies the corresponding storage unit. Each of storage units 301-303 further contains metadata that includes enough information access data stored therein independently.

In one embodiment, each of storage units 301-303 may store data representing a portion or partition of a file system that has been partitioned into multiple partitions, where the file system partitions collectively represent a single logical file system of storage system 300 (also referred to as a collection of file system partitions or a file system collection). The metadata stored in each of the file system partitions includes enough information to enable the partition to be self-identifiable and configurable, such that each file system partition can be individually started up or removed without having a major impact on operations of rest of the overall file system collection.

According to one embodiment, each FS partition of the file system collection contains metadata having enough information that enables the corresponding partition to be individually identifiable and configured. Some information is specific to the FS partition and part of the information pertains to the entire FS collection. In one embodiment, the FS collection specific information stored in the active and archive partitions may be different, while the FS partition specific information may be identical or similar.

In one embodiment, FS partition metadata that is specific to an FS partition includes, but is not limited to, at least some of a unique name of the partition, a version of the partition, an access state of the partition, an associated container set ID, a partition universally unique identifier (UUID), an originator UUID, a non-volatile random-access memory (NVRAM) ID, a partition runtime state, and a partition sealed state.

The access state of an FS partition can be one of ENABLED, DISABLED, or PROBLEM. The container set ID includes a name of the container set within the associated FS partition, where the container set holds all the data of the FS partition. A partition UUID of an FS partition uniquely identifies the corresponding FS partition. An originator UUID uniquely identifies the originator of this partition and can be used for replication purposes. A NVRAM ID is used to identify the associated NVRAM area for the corresponding partition. A partition runtime state contains information indicating a runtime state of the partition. The partition runtime state can be one of initializing, recovering NVRAM, ready (e.g., has been mounted), opened, checking (e.g., an offline tool is accessing the partition), checked (e.g., an offline tool has completed access of the partition), unmounted, and destroyed. A partition sealed state indicates whether the corresponding partition has been sealed. If the partition has been sealed, no further write access can be performed on the partition.

In one embodiment, the above information maintained in each archive partition can be used to uniquely determine each archive partition independently. If the partition is healthy, the file system can bring the partition online. If the file system determines that the partition is not healthy, it can mark and keep the partition offline and/or put the partition in a problem state. As a result, the file system can remain online as long as the active partition is healthy. One or more archive partitions may be damaged but the file system remains available.

In addition, each FS partition further includes some metadata related to the entire file system collection. In one embodiment, such metadata includes, but is not limited to, a collection partition type (e.g., active, target, or archive) and a collection ID that uniquely identifies the collection of which the corresponding partition is a member. Further, metadata in each of the archive FS partitions further includes a header having a version number, sequence number, and a checksum value and a partition table. The partition table includes a collection ID identifying a file system collection of which the associated partition is a member, a number of partitions in the collection, UUIDs of all archive partitions in the file system collection, and a prime or prime segment representing a consistent point of the file system collection.

In one embodiment, the above information kept in the active partition helps to identify all the different partitions of the collection (file system). The file system uses this information to discover all the partitions and tries to bring them online. However, if the active partition is corrupted, the collection information is not available and the file system cannot be brought online immediately. This collection information must then be assembled by probing some or all the archive partitions available on the system. The archive partitions will identify themselves as part of a collection and this information from archive partitions can be used to recreate the collection information of the active partition.

In a single node storage configuration, according to one embodiment, the file system partitions may share a memory region of a system memory in the storage system by swapping the file system partitions in and out of the memory region without having to allocating additional memory. Further, file system may be partitioned based on an access pattern of the data files. For example, data files may be grouped into a particular file system partition based on a time attribute (e.g., last modified time attribute) of the data files, such that data files having similar access patterns are stored in the same file system partition. As a result, the efficiency of the resource usage can be greatly improved.

In one embodiment, the metadata stored in each of storage units 301-302 includes enough information to construct a consistent point of at least the corresponding file system partition. The metadata of one or more file system partitions may be utilized to collectively represent a consistent point of the entire file system.

According to one embodiment, periodically, after all data has been flushed to a storage unit, a prime segment is written to the storage unit to mark a consistent point or view of the file system. When the file system crashes or restarts, the latest prime segment can be utilized to restore the latest state of the file system. In one embodiment, each prime segment is identified by a prime segment ID that uniquely identifies the corresponding prime segment. A prime segment ID may be determined in an incremental order every time when a new prime segment is to be written. A prime segment ID may be represented by a sequence number when the prime segment is generated.

Referring back to FIG. 3A, according to one embodiment, system 300 represents an archiving storage system. During normal operations, external or fresh user data is written to a first active storage unit (e.g., active storage unit), in this example, storage unit 301. Periodically, data stored in the active storage unit is migrated to a second storage unit, in this example, storage unit 302, which is also referred to as a target storage unit. When the target storage unit has been filled up to a predetermined threshold, it is sealed. After sealing, the storage unit becomes read-only. Another empty storage unit may then be allocated and designated as a new target storage unit to archive further data from the active storage unit.

Data migration may be performed according to a variety of data migration policies. According to some embodiments, the files are stored as one or more segments, where the segments are deduplicated (e.g., only one copy is stored and is/can be used to reconstruct more than one file) in the storage system (e.g., deduplicated across one storage unit of the system). Segments are stored in a main or active storage unit (e.g., storage unit 301) and periodically (e.g., every week), based on a transfer protocol (e.g., storage unit is above a capacity limit, a number of segments every hour, when inactive, etc.), or when the storage unit is full or meets one or more conditions (e.g., is 80% full, is less than 20% active, has had no accesses in last hour, etc.), segments belonging to files identified based on a migration policy (e.g., files of a certain file type that have not been modified or accessed for a predetermined period of time are to be migrated, etc.) are transferred to a target storage unit (e.g., storage unit 302).

As the target storage unit is filled, metadata (e.g., prime set 304) is transferred to the target storage unit so that the target storage unit has all the necessary information to access files in the second storage unit (e.g., prime sets 305-306). The metadata enables the system to reconstruct files that are stored in the system (e.g., in the whole system, in a storage unit, etc.) and/or associated files that are stored in the system with their file names. This also allows the system to power down or reduce power of a storage unit for energy conservation or to take a storage unit off-line to upgrade a storage unit or to enable the system to be fault tolerant in that the system can operate if any given storage unit fails. The system can be expanded by adding storage units incrementally. Files can be accessed using the single name space providing an easy to use interface. Hardware may be efficiently used as only one deduplicating engine is used for multiple storage units.

In one embodiment, a file is identified by a name that is independent of the storage unit the file is stored in. When a file is received to be stored, a name is also received to be associated with the file. When a request to read a file is received, a name is also received. The system looks up the metadata associated with the files in the system to identify the file associated with the received name. It then looks up the metadata associated with the identified file to determine the storage unit in which the identified file is stored. In one embodiment, the metadata associated with the files in the system may be maintained in a main or active storage unit. Alternatively, the metadata may be maintained in each storage unit where the files associated with the metadata are stored. In addition, the metadata may be maintained in a distributed and/or redundant manner across many storage units (e.g., for fault tolerance). Furthermore, the metadata may be maintained in a separated storage unit or storage unit, or any other appropriate storage location.

In some embodiments, if the active storage unit fails, the system uses the metadata contained in other attached storage units (e.g., a previously active storage unit) to provide access to the files still in the system. In one embodiment, when a storage unit is unavailable (e.g. the storage unit has failed, is being upgraded, etc.), the system remains up to provide access to any file not stored in the failed storage unit.

Referring back to FIGS. 3A and 3B, according to one embodiment, system 300 maintains PSWM 216 to contain information indicating which of storage units 301-303 to which a next prime is to be written. In this example, during normal operations, PSWM 216 contains a storage unit ID identifying storage unit 301, as the external user data is being written to storage unit 301. During a periodic checking pointing operation of the file system, data (e.g., dirty data) is flushed to storage unit 301 and a new prime segment 304 is only written to storage unit 301, because PSWM 216 only contains the storage unit ID of storage unit 301.

During data migration, as shown in FIG. 3B, data stored in storage unit 301 is migrated to storage unit 302. According to one embodiment, PSWM 216 is modified or expanded to include storage unit IDs of both storage units 301-302. As a result, a new prime is written to both storage units 301-302 as prime segments 304-305. After the data migration, PSWM 216 is modified or shrunk again to only contain storage unit ID associated with storage unit 301, such that a subsequent prime is to be written to storage unit 301.

For example, prior to data migration, PSWM 216 only points to storage unit 301. It is assumed that at some points, a prime having a prime sequence ID of 10 is written to storage unit 301, as prime segment #10. At this point, a consistent point of the file system can be ascertained based on prime segment #10 stored in storage unit 301. During data migration, PSWM 216 is modified to include storage unit IDs of both storage units 301-302. At the end of data migration, a prime having a prime sequence ID of 11 is written to both storage units 301-302. At this point in time, a consistent point of the file system can be ascertained based on prime segment #11 stored in both storage units 301-302. After the data migration ends, PSWM 216 is modified to only contain the storage unit ID of storage unit 301. Subsequently, when a new prime is to be written, the new prime segment is written to storage unit 301 based on PSWM 216 as prime segment #12. At this point in time, a consistent point of the file system can be ascertained based on prime segment #12 and prime segment #11, stored in storage units 301-302 respectively. In order to verify whether the latest prime is an installable, the system needs to verify whether storage unit 301 contains prime segment #12 and whether storage unit 302 contains prime segment #11. Since storage unit 303 is not involved, there is no need to access storage unit 303.

In a conventional multi-node system, such a prime segment would be written to all of storage units 301-303 in order to mark a consistent point of the file system. In order to verify a consistent point of the file system, the metadata and the associated content have to be verified in each of the storage units. Such a process may take a long time. In addition, such an approach may not work on an archiving system. As described above, some of the storage units, such as storage unit 303, are configured to be read-only storage units and they may be powered down or unavailable. By using PSWM 216, the new prime segment is only written to one or more storage units identified by PSWM 216, without having to write the prime segment to all of the storage units.

Figure 4:
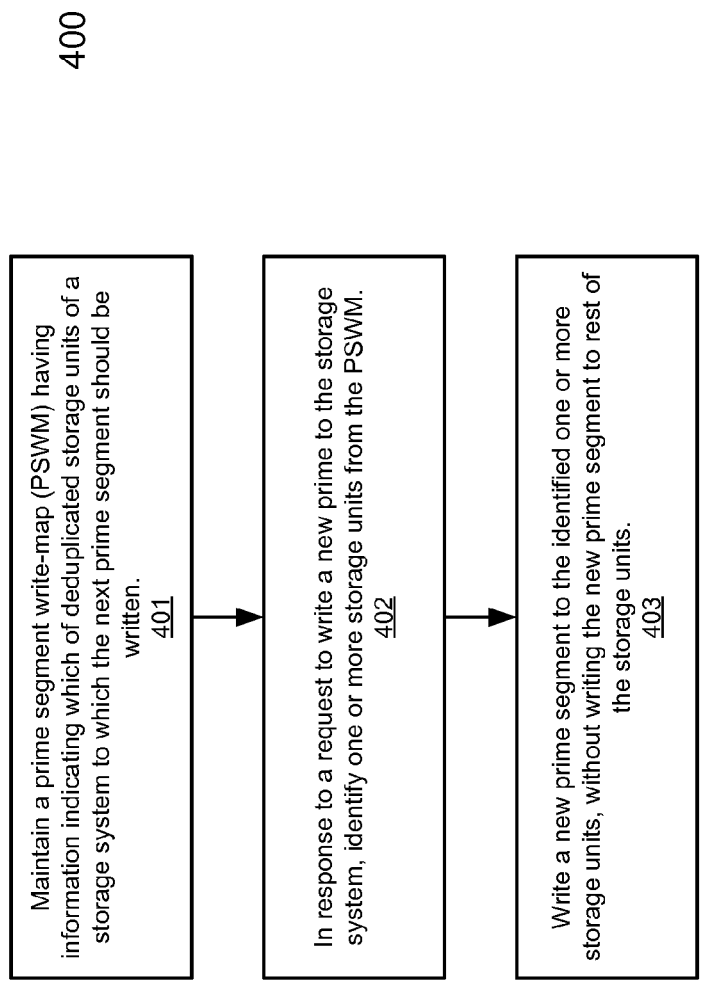
FIG. 4 is a flow diagram illustrating a method for maintaining a consistent point of a file system according to one embodiment of the invention.

FIG. 4 is a flow diagram illustrating a method for maintaining a consistent point of a file system according to one embodiment of the invention. For example, method 400 may be performed by segment storage engine 107 of FIGS. 1-2. Referring to FIG. 4, at block 401, a PSWM is maintained having information indicating which of deduplicated storage units of a storage system to which a next prime segment is to be written. At block 402, in response to a request for writing a new prime segment, one or more of the storage units are identified based on the PSWM. At block 403, the new prime segment is written to the identified one or more storage units without having to write the same prime segment to the rest of the storage units.

FIG. 5 is a flow diagram illustrating a method for maintaining a consistent point of a file system according to another embodiment of the invention. Method 500 may be performed by segment storage engine 107 of FIGS. 1-2. Referring to FIG. 5, at block 501, a request is received for data migration from an active storage unit to a target storage unit of a deduplicated storage system. At block 502, in response to the request, a PSWM is modified to reference to at least the active storage unit and the target storage unit. At block 503, the data migration is performed from the active storage unit to the target storage unit, including writing an updated prime segment to both the active and target storage units based on the PSWM. At block 504, in response to a signal indicating an end to the data migration, the PSWM is modified to remove the target storage unit, such that a subsequent prime segment is to be written to the active storage unit only.

As described above, a prime may be represented by multiple prime segments having dependency relationships amongst them. For example, during data migration, data stored in an active storage unit may have a dependency relationship with data stored in a target storage unit. As a result, at the end of the data migration, a prime segment is written to both the active and target storage units based on the PSWM. After the data migration, subsequent prime segments will be written to the active storage unit only. In order to identify all of the prime segments that constitute the latest prime, such dependency relationships must be maintained. According to one embodiment, a prime dependency list is maintained in at least one of the prime segments, such as the latest prime segment of the active storage unit. The prime dependency list includes information identifying other prime segment stored in other storage units that have a dependency relationship with the prime segment stored in the active storage unit.

Figure 6A:
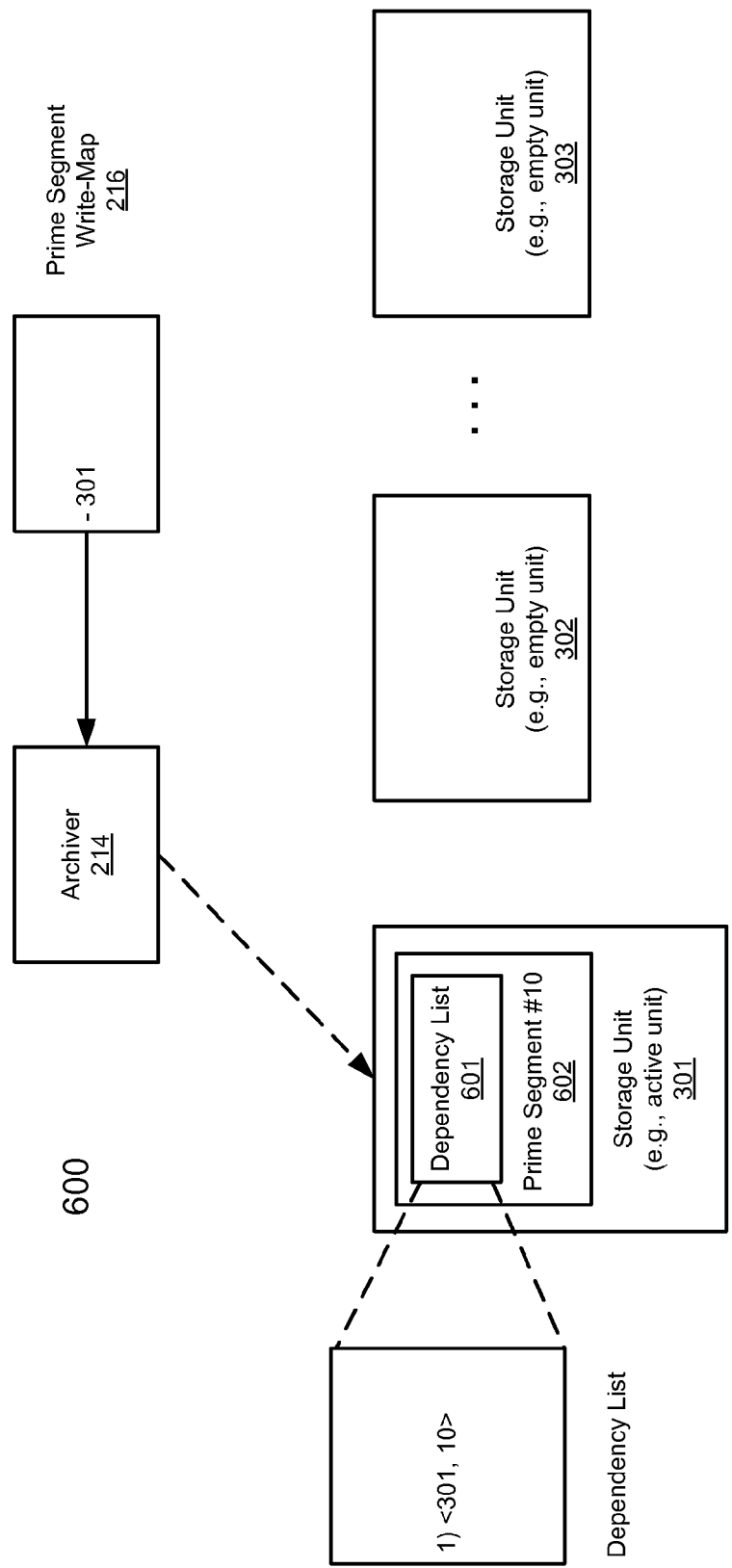
FIGS. 6A-6C are block diagrams illustrating a system to maintain consistent point of a storage system according to one embodiment of the invention.
Figure 6B:
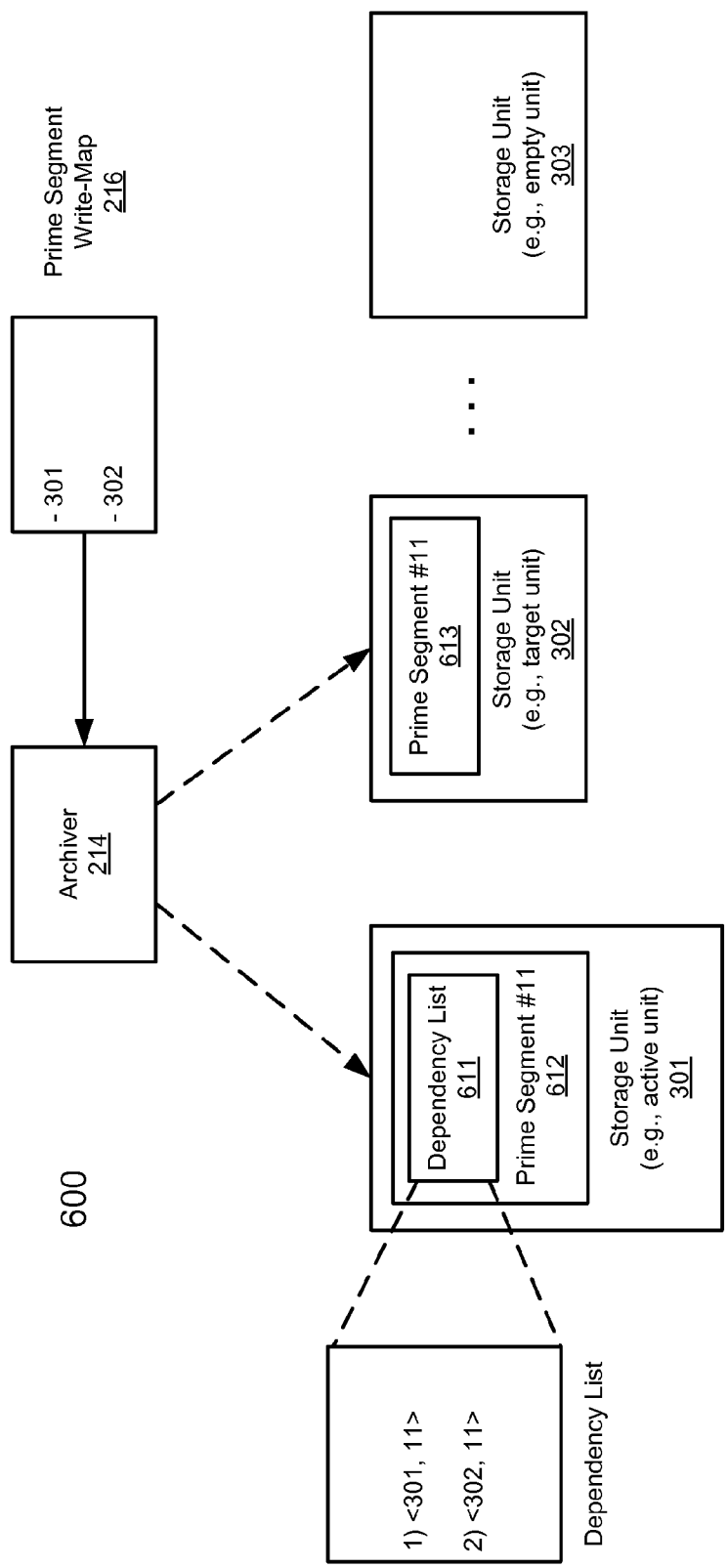
Figure 6C:
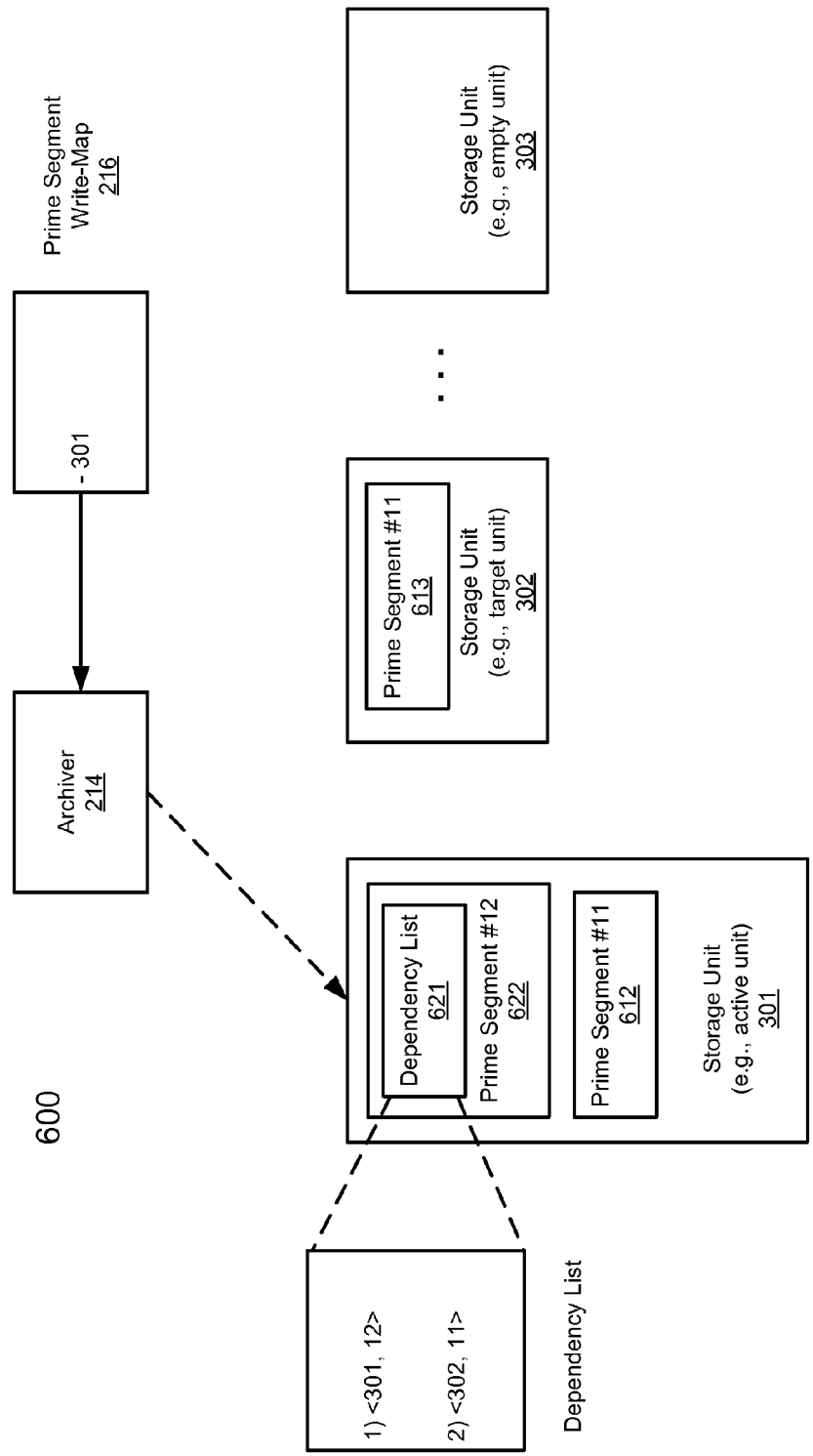

FIGS. 6A-6C are block diagrams illustrating a system to maintain consistent point of a storage system according to one embodiment of the invention. For example, system 600 may be implemented as part of storage system 104 of FIG. 1.

Referring to FIGS. 6A-6C, in addition to maintaining PSWM 216, system 600 further maintains a prime dependency list associated with the prime segment stored in the active storage unit 301. The prime dependency list includes a list of one or more prime segments that depend on each other to form an installable prime. The prime segments listed in the prime dependency list collectively represent an installable prime.

During the normal operations as shown in FIG. 6A, external user data is written only to active storage unit 301 and PSWM 216 only contains a storage unit ID associated with storage unit 301. Suppose the other two storage units 302 and 303 are empty. At this point, the prime segment 602 stored on the active storage unit 301 does not have any dependency on storage units 302 and 303. Thus, dependency list 601 associated prime segment 602 only contains one entry having a storage unit ID identifying active storage unit 301 and a prime ID identifying prime segment 602. In this example, dependency list 601 indicates that the latest prime includes prime segment #10 stored in the active storage unit (e.g., storage unit 301). At this point, prime segment 602 can be used to generate a consistent point of the file system.

Subsequently, during the first data migration as shown in FIG. 6B, data is migrated from active storage unit 301 to target storage unit 302. As described above, prior to start of the data migration, PSWM 216 is modified to include storage unit IDs that identify both active storage unit 301 and target storage unit 302 to indicate that a next prime segment is to be written to both storage units 301-302. In this example, it is assumed that the next prime has ID #11, which is written to both storage units 301-302 as prime sets 612-613, respectively. In order to capture the relationship between data stored in storage units 301-302, prime dependency list 611 is maintained within prime segment 612 to indicate that the latest prime segment is represented by prime segment 612 stored in storage unit 301 and prime segment 613 stored in storage unit 302. In this example, prime dependency list 611 includes two entries: 1) a first storage unit ID identifying active storage unit 301 and a first prime segment ID identifying prime segment 612; and 2) a second storage unit ID identifying target storage unit 302 and a second prime segment ID identifying prime segment 613. In this example, both prime segments 612-613 from the prime having sequence number #11. At this point, prime segments 612-613 can be used to generate a consistent point of the file system. That is, as long as prime segment 612 can be verified to be present in storage unit 301 and prime segment 613 can be verified to be present in storage unit 302, a prime represented by prime segments 612-613 can be considered as an installable prime for the purpose of generating a consistent point of the file system.

After the data migration as shown in FIG. 6C, as described above, PSWM 216 is modified to only reference to active storage unit 301, such that subsequent prime segment will only be written to active storage unit 301. In this example, it is assumed that after the data migration, a new prime having ID #12 is written to active storage unit 301 as prime segment 622 based on the information of PSWM 216, without writing the same prime segment to storage units 302-303. In addition, prime dependency list 621 of prime segment 622 is updated to include references pointing to both prime segments 622 and 613 stored in storage units 301-302, respectively. In this example, prime dependency list 621 includes two entries: 1) a first storage unit ID identifying active storage unit 301 and a prime segment ID identifying prime segment 622; and 2) a second storage unit ID identifying target storage unit 302 and a prime segment ID identifying prime segment 613. At this point, prime segments 622 and 613 can be used to generate a consistent point of the file system. That is, as long as prime segment 622 can be verified to be present in storage unit 301 and prime segment 613 can be verified to be present in storage unit 302, the prime represented by prime segments 622 and 613 can be considered as an installable for the purpose of generating a consistent point of the file system.

Therefore, as described above, a new prime segment is written to whatever storage unit or units indicated by PSWM 216. During a data migration process, PSWM 216 is modified to specify both the active storage unit and target storage unit to which a next prime segment is to be written. In addition, a prime dependency list is generated describing the dependency relationship between prime segments and data stored in the active and target storage units. That is, a prime can be ascertained based on multiple prime segments stored in multiple storage units, without having to write the same prime segment to all of the storage units all the time. As a result, a consistent point of a file system can be ascertained in a more efficient manner and less storage space is required.

Figure 7:
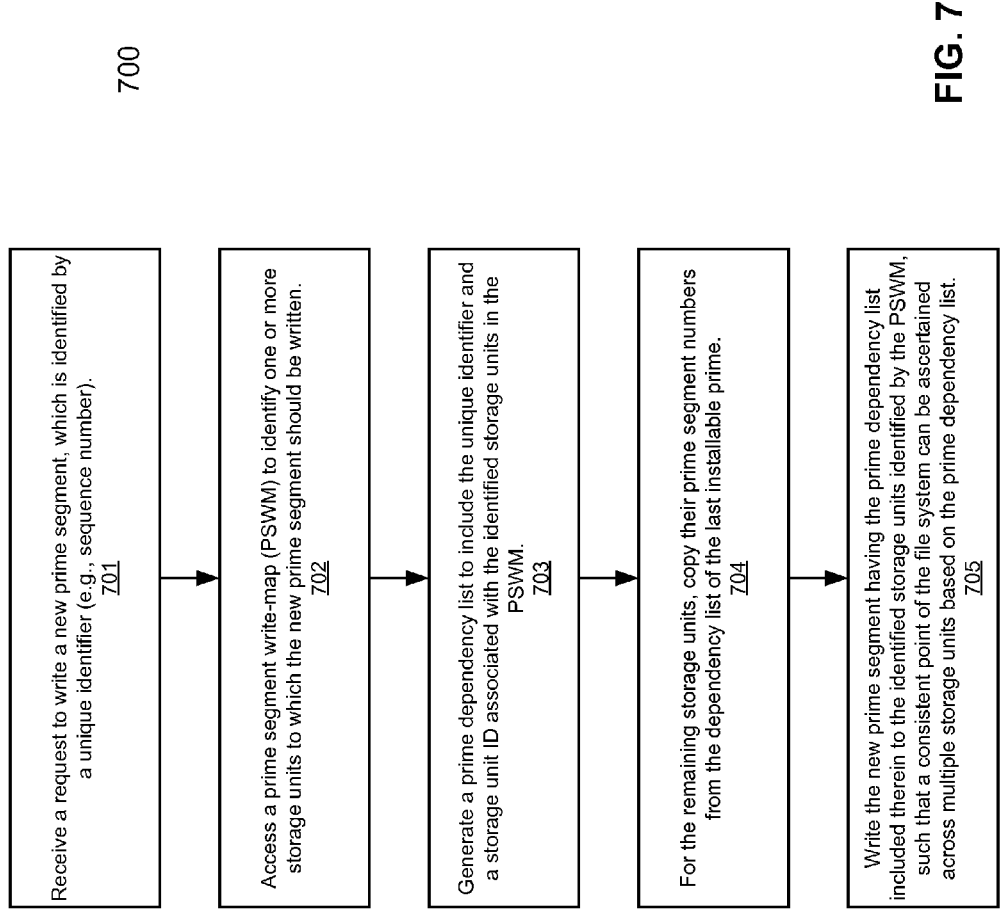
FIG. 7 is a flow diagram illustrating a method for maintaining a consistent point of a file system using a prime dependency list according to one embodiment of the invention.

FIG. 7 is a flow diagram illustrating a method for maintaining a consistent point of a file system using a prime dependency list according to one embodiment of the invention. For example, method 700 may be performed by system 600 as shown in FIGS. 6A-6C. Referring to FIG. 7, at block 701, a request is received to write a new prime segment to a storage unit, where the new prime segment is identified by a unique ID (e.g., sequence number). At block 702, in response to the request, a PSWM is accessed to identify one or more storage units to which the new prime segment should be written. At block 703, a prime dependency list is generated to include the unique identifier and a storage unit ID associated with the identified storage units in the PSWM. At block 704, for the rest of the storage units, their prime segment numbers are copied from the dependency list of the last installable prime. At block 705, the new prime segment having the prime dependency list included therein is written to the identified storage units as prime sets. As a result, a consistent point of a file system can be ascertained based on multiple prime sets across multiple storage units without having to write the same prime segment to all storage units.

Figure 8:
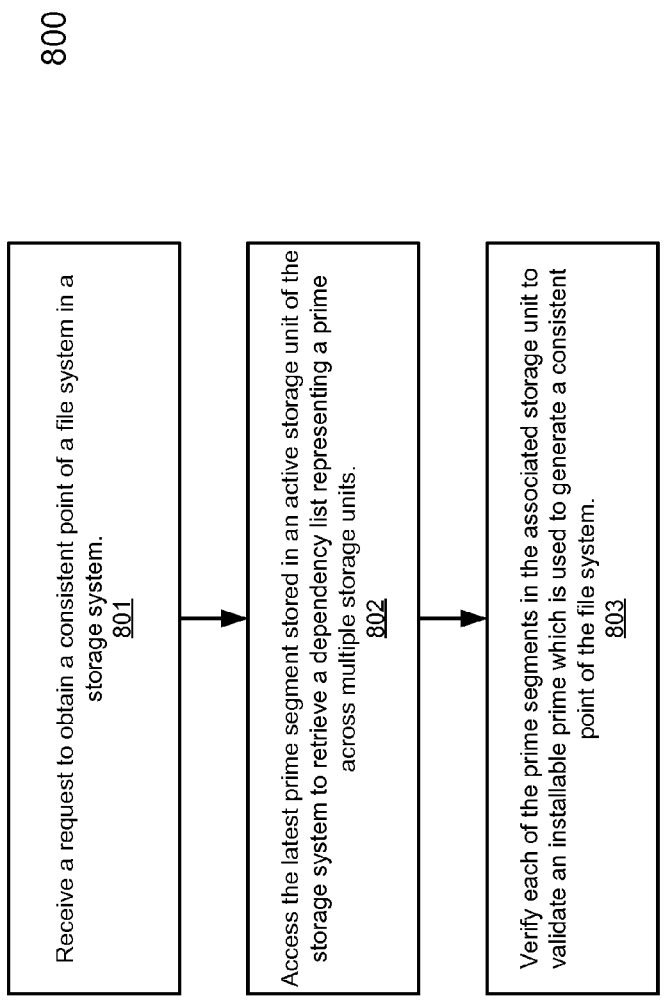
FIG. 8 is a flow diagram illustrating a method for maintaining a consistent point of a file system using a prime dependency list according to another embodiment of the invention.

FIG. 8 is a flow diagram illustrating a method for maintaining a consistent point of a file system using a prime dependency list according to another embodiment of the invention. Method 700 may be performed by system 600 as shown in FIGS. 6A-6C. Referring to FIG. 8, at block 801, a request is received to obtain a consistent point of a file system of a storage system. In response to the request, at block 802, the latest prime segment stored in an active storage unit of the storage unit is accessed to retrieve a prime dependency list, where the prime dependency list represents a prime segment across multiple storage units. At block 803, each of the prime segments listed in the prime dependency list is verified in the associated storage unit to validate an installable prime. The installable prime is utilized to generate a consistent point of the file system.

Figure 9:
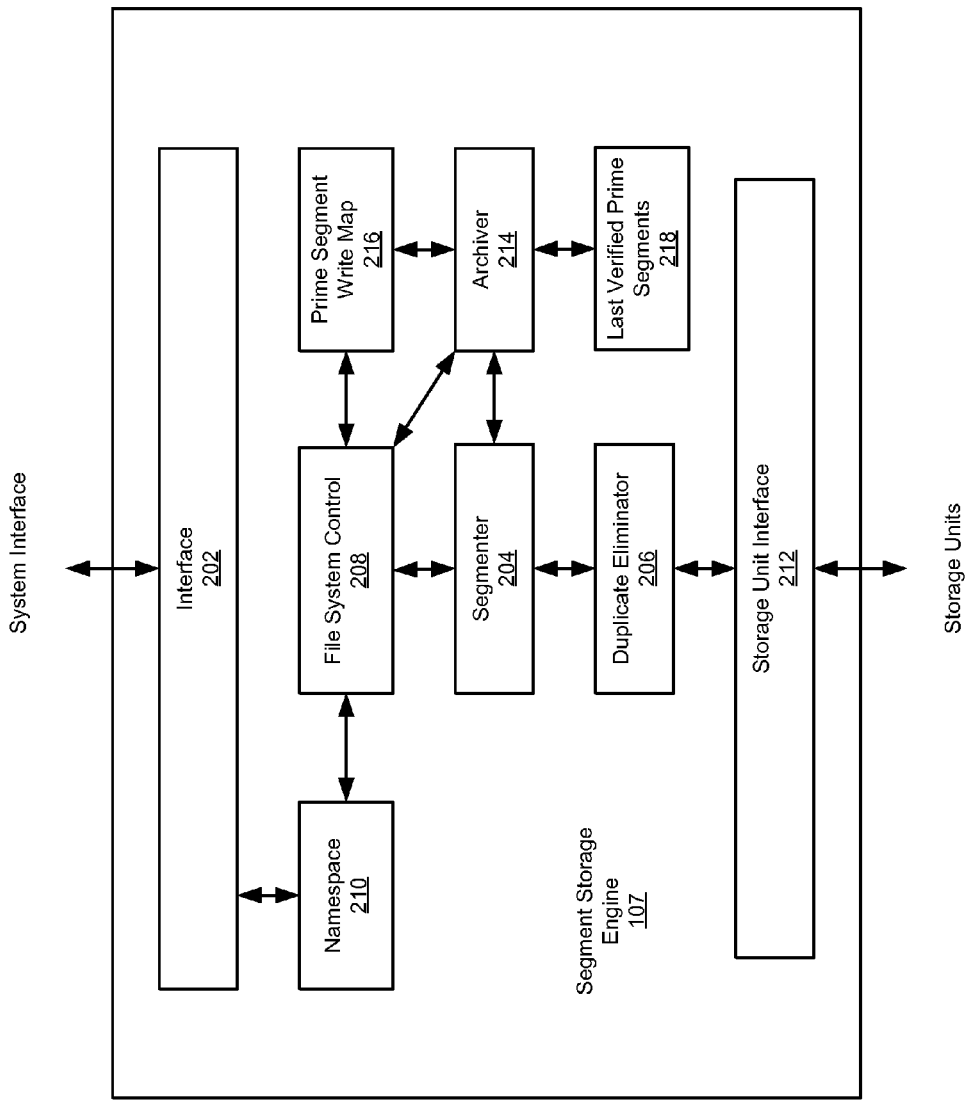
FIG. 9 is a block diagram illustrating a segment storage engine of a storage system according to another embodiment of the invention.

FIG. 9 is a block diagram illustrating a segment storage engine of a storage system according to another embodiment of the invention. For example, segment storage engine 900 may be implemented as part of segment storage engine 107 of FIG. 1. Referring to FIG. 9, similar to segment storage engine 107 of FIG. 2, segment storage engine 900 includes interface 202, segmenter 204, duplicate eliminator 206, file system 208, index 210, storage unit interface 212, archiver 214, and PSWM 216 having functionalities identical or similar to those described above.

In one embodiment, segment storage engine 900 further includes a cache to cache a copy of the last verified prime segment 218. The last verified prime segment 218 may be cached in a persistent storage location such as a hard drive and it is loaded into a system memory of the storage system during a startup of the storage system. When a new prime segment has been successfully verified, the last verified prime segment 218 is updated accordingly. In one embodiment, cached verified prime segment 218 essentially represents a prime dependency list of the last known verified prime segment (e.g., the latest installable prime segment). Cached verified prime segment 218 is utilized to improve an efficiency of verification of another prime segment.

As described above, in order to verify a prime, each of one or more prime segments in the dependency list of the prime has to be verified in its corresponding storage unit. According to one embodiment, if a prime segment in the current prime's dependency list is listed in the cached verified prime 218's dependency list that particular prime segment does not need to be verified again for the current prime. Since that particular prime segment has already been verified in the last known verified prime, there is no need to verify the same prime segment again. As a result, the verification process can be performed in a more efficient way.

Figure 10:
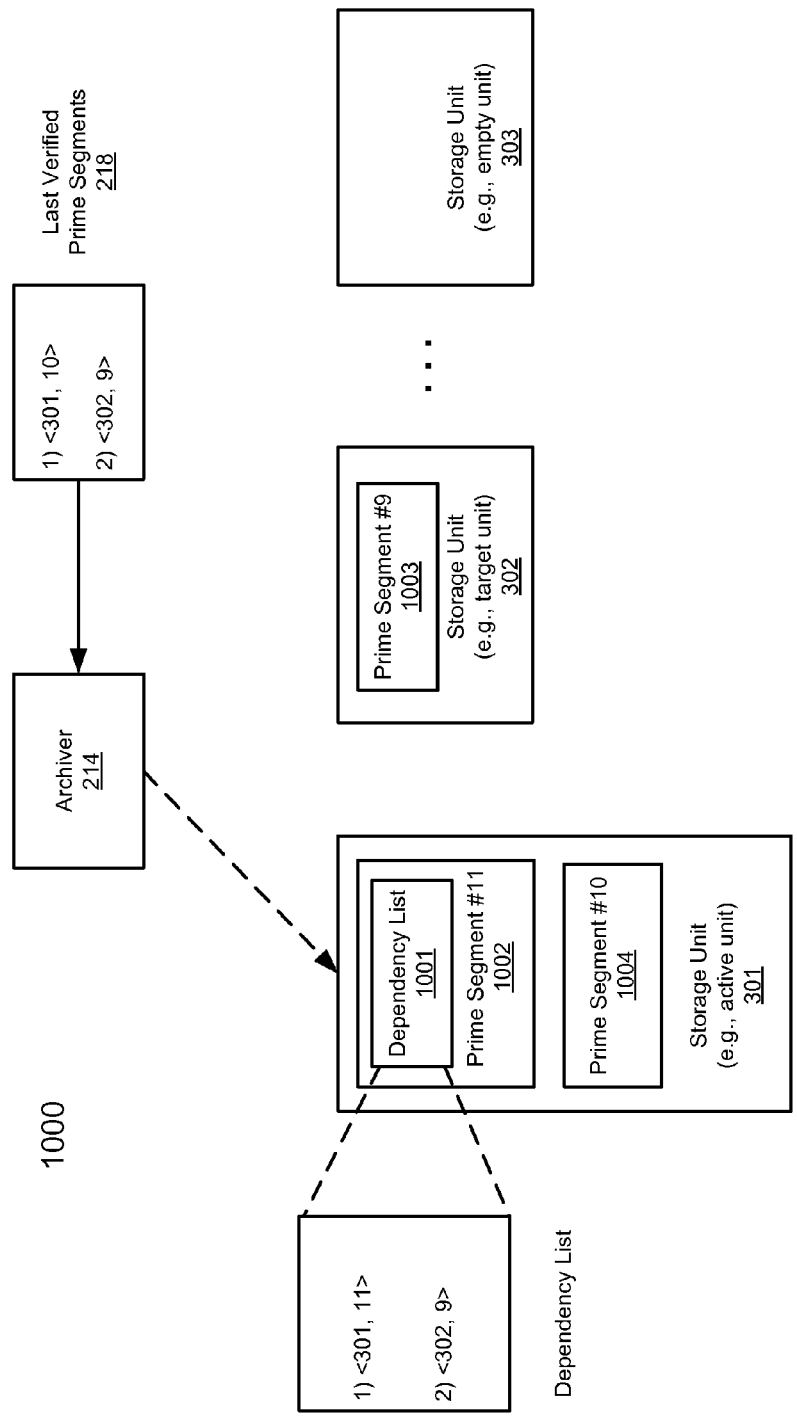
FIG. 10 is a block diagram illustrating a mechanism to verify an installable prime segment of a storage system according to one embodiment of the invention.

FIG. 10 is a block diagram illustrating a mechanism to verify an installable prime of a storage system according to one embodiment of the invention. System 1000 may be implemented as part of system 900 as shown in FIG. 9. Referring to FIG. 10, it is assumed that the latest prime segment is represented by prime dependency list 1001, which includes references to prime set #11 (e.g., prime set 1002 stored in storage unit 301) and prime set #9 (e.g., prime set 1003 stored in storage unit 302), respectively. When a request for verifying an installable prime segment is received, for example, during a startup of the storage system, according to one embodiment, each of entries in prime dependency list 1001 is compared with each of entries in the cached last verified prime segment 218. A prime set of an entry in prime dependency list 1001 that is not listed in the last verified prime segment 218 requires to be verified. Another word, verification of a prime set of an entry in prime dependency list 1001 that matches one in the last verified prime segment 218 is skipped, since it has been previously verified.

In this example, prime dependency list 1001 includes two entries: 1) storage unit ID of unit 301 and ID #11 of prime segment 1002; and 2) storage unit ID of unit 302 and ID #9 of prime segment 1003. Last verified prime includes two entries: 1) storage unit ID of unit 301 and ID #10 of prime segment 1004; and 2) storage unit ID of unit 302 and ID #9 of prime segment 1003. During the verification process, each of the entries in prime dependency list 1001 is compared with each of the entries in the last verified prime 218, which is essentially the prime dependency list of the last known installable prime. In this example, the second entry (e.g., <302, 9>) of both lists 1001 and 218 are matched. As a result, the corresponding prime segment of the second entry does not need to be verified; only the prime segment of the first entry of list 1001 (e.g., <301, 11>) needs to be verified. As a result, the efficiency of the verification process can be greatly improved. After the verification process has been performed successfully, the last verified prime 218 is updated accordingly. In this example, the last verified prime 218 will include entries of <301, 11> and <301, 9>.

Figure 11:
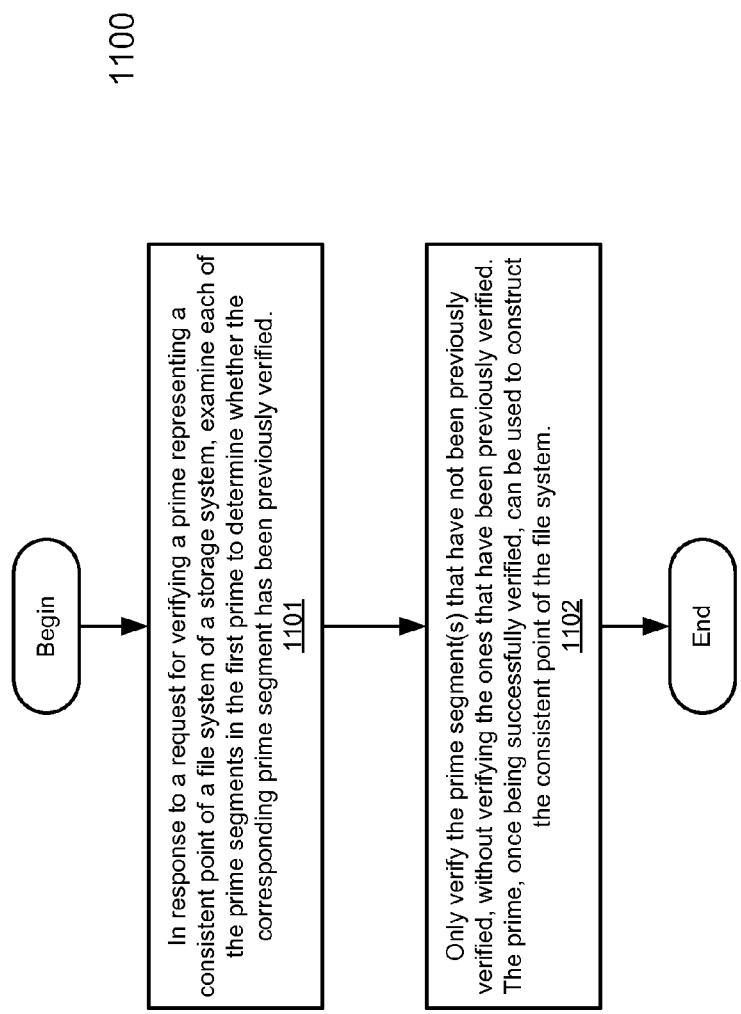
FIG. 11 is a flow diagram illustrating a method for verifying a prime segment of a storage system according to one embodiment of the invention.

FIG. 11 is a flow diagram illustrating a method for verifying a prime segment of a storage system according to one embodiment of the invention. Method 1100 may be performed by system 1000 of FIG. 10. Referring to FIG. 11, at block 1101, in response to a request for verifying a prime segment representing a consistent point of a file system of a storage system, each of prime sets of a first prime set (e.g., prime set stored in an active storage unit) is examined to determine whether the corresponding prime set has been previously verified. At block 1102, only the prime set or prime sets that have not been previously verified are to be verified, without having to verify those that have been previously verified. Once the new prime segment is verified, it can be used to construct a consistent pint of the file system.

Figure 12:
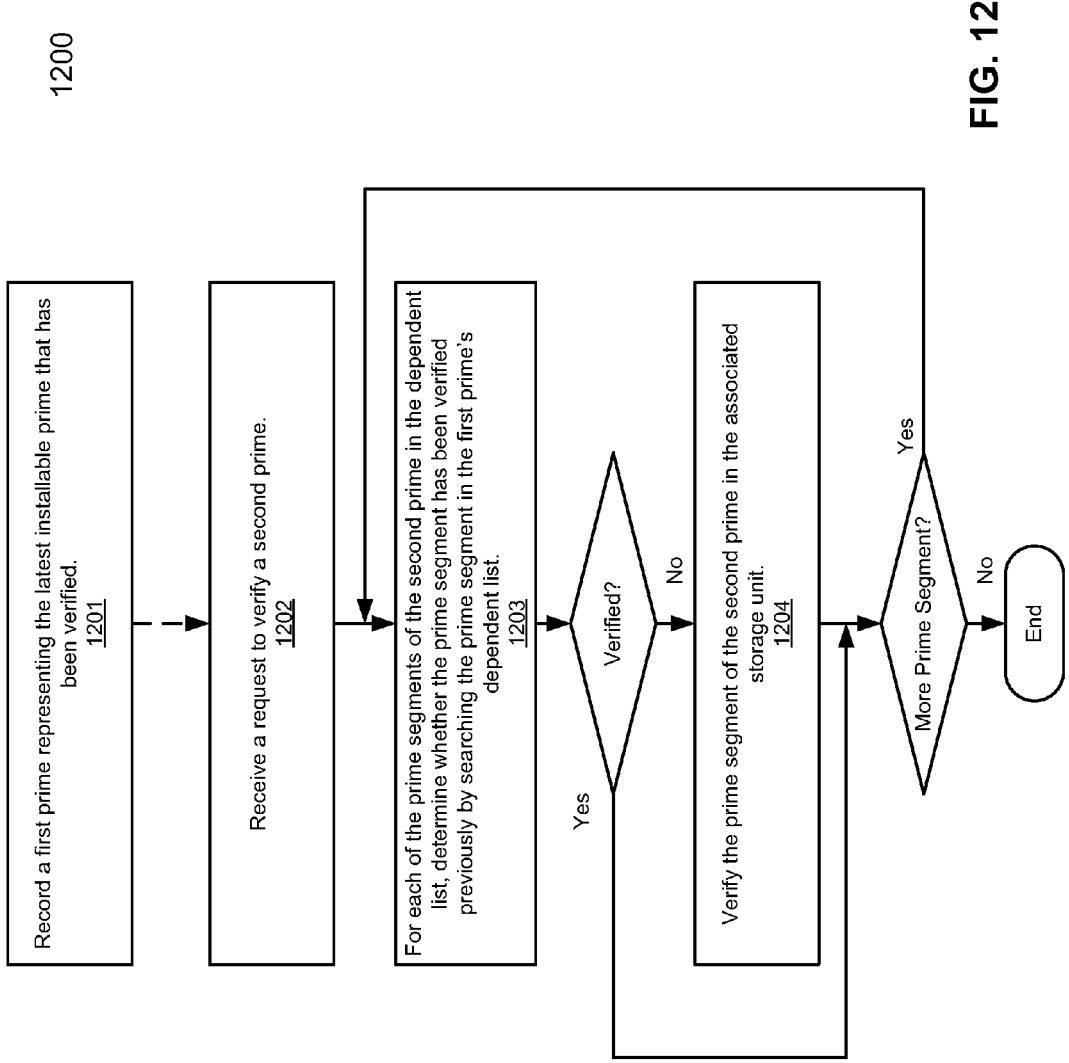
FIG. 12 is a flow diagram illustrating a method for verifying a prime segment of a storage system according to another embodiment of the invention.

FIG. 12 is a flow diagram illustrating a method for verifying an installable prime of a storage system according to another embodiment of the invention. Method 1200 may be performed by system 1000 of FIG. 10. Referring to FIG. 12, at block 1201, a first installable prime is recorded, where that prime includes multiple prime segments collectively representing that prime. Subsequently, at block 1202, a request is received for verifying if the second prime is installable. At block 1203, for each of the prime segments in the second prime's dependency list, it is determined whether the prime segment has been previously verified by searching and matching the prime segments in the first prime's dependency list. If the prime segment has not been previously verified (e.g., not found in the first prime segment), at block 1204, the prime segment is verified in the associated storage unit; otherwise, the verification of the prime segment is skipped. The above processes can be iteratively performed for each of the prime segment in the second prime's dependency list.

Figure 13:
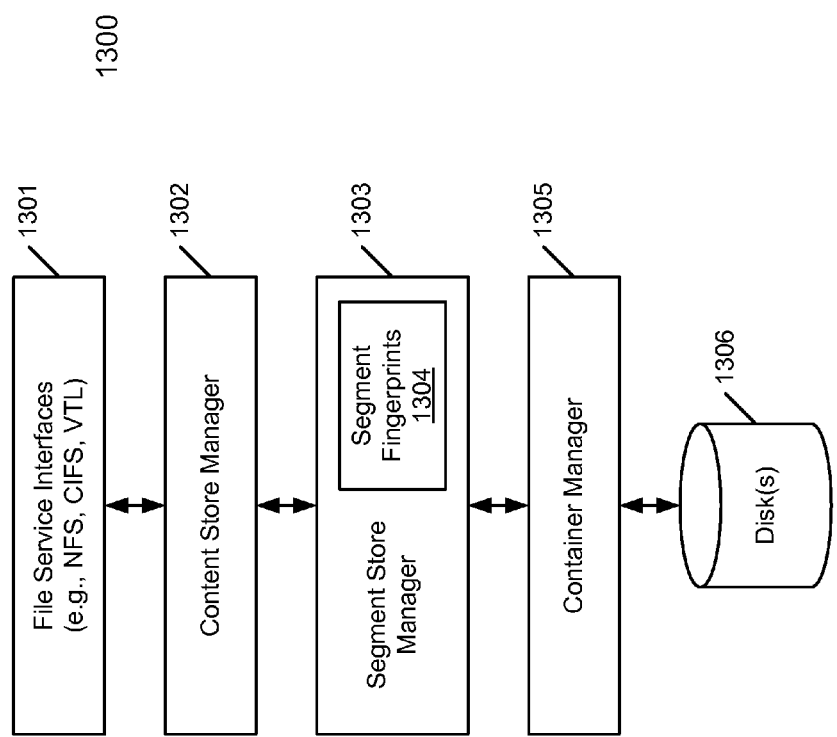
FIG. 13 is a block diagram illustrating an example of a data storage system which may be used with an embodiment of the invention.

FIG. 13 is a block diagram illustrating an example of a data storage system which may be used with an embodiment of the invention. For example, system 1300 may be implemented as part of a storage system as shown in FIG. 1. In this example, system 1300 is a deduplicating data storage system. Referring to FIG. 13, system 1300 includes, but it is not limited to, file service interface 1301, content store manager 1302, segment store manager 1303 having segment fingerprints 1304, and container manager 1405 for managing segments stored in containers in disk or disks 1306.

According to one embodiment, system 1300 breaks a data object (e.g., a file) into variable-length segments in a content dependent manner and computes a fingerprint for each segment. System 1300 uses the fingerprints both to identify duplicate segments and as part of a segment descriptor used to reference a segment. It represents files as sequences of segment fingerprints. During writes, system 1300 identifies duplicate segments and does its best to store only one copy of any particular segment. Before storing a new segment, system 1300 may use a variety of compression algorithm, such as a variation of the Ziv-Lempel algorithm, to compress the segment. In one embodiment, system 1300 supports multiple access protocols which are layered on a common file services interface 1301. Supported protocols include a network file system (NFS), a common Internet file system (CIFS), and a virtual tape library interface (VTL), etc. System 1300 includes an administrative interface for managing the system. The administrative interface may be a part of file services interface 1301.

When a data stream enters system 1300, it goes through one of the standard interfaces to the generic file services layer, which manages the name space and file metadata. The file services layer forwards write requests to content store manager 1302 which manages the data content within a file. Content store manager 1302 breaks a data stream into segments, uses segment store manager 1303 to perform deduplication, and keeps track of the references for a file (e.g., mapping between logical data objects and physical data objects). Segment store manager 1303 does the actual work of deduplication. It packs deduplicated (unique) segments into relatively large units, compresses such units using a variation of compression algorithms, such as a Ziv-Lempel algorithm, to further compress the data, and then writes the compressed results into containers managed by container manager 1305.

To read a data stream from system 1300, a client drives the read operation through one of the standard interfaces and the file services layer 1301. Content store manager 1302 uses references to deduplicated segments to deliver the desired data stream to the client. Segment store manager 1303 prefetches, decompresses, reads and caches data segments from container manager 1305. According to one embodiment, content store manager 1302 implements byte-range writes and reads for deduplicated data objects, where an object is a linear sequence of client data bytes and has intrinsic and client-settable attributes or metadata. An object may be a conventional file, a backup image of an entire volume or a tape cartridge.

To write a range of bytes into an object, content store manager 1302 performs several operations. First, anchoring partitions the byte range into variable-length segments in a content dependent manner. Then segment fingerprinting computes a hash such as the SHA-1 hash and generates the segment descriptor based on it. Each segment descriptor contains per segment information of at least fingerprint and size. Further, segment mapping builds the tree of segments that records the mapping between object byte ranges and segment descriptors. The goal is to represent a data object using references to deduplicated segments. To read a range of bytes in an object, content store manager 1302 traverses a tree of segments created by the segment mapping operation above to obtain the segment descriptors for the relevant segments. It fetches the segments from a segment store (not shown) and returns the requested byte range to the client.

Segment store manager 1303 essentially manages a database of segments keyed by their segment descriptors 1304. To support writes, it accepts segments with their segment descriptors and stores them. To support reads, it fetches segments designated by their segment descriptors. To write a data segment, segment store performs several operations. First, segment filtering determines if a segment is a duplicate. This is the key operation to deduplicate segments and may trigger disk I/Os, thus its overhead can significantly impact throughput performance. Further, container packing adds segments to be stored to a container which is the unit of storage in the system. The packing operation also compresses segment data using a variety of compression algorithms such as a variation of the Ziv-Lempel algorithm. A container, when fully packed, is appended to container manager 1305. Finally, segment indexing updates the segment index that maps segment descriptors to the container holding the segment, after the container has been appended to container manager 1305. To read a data segment, segment store manager 1303 performs certain operations. First, segment lookup finds the container storing the requested segment. This operation may trigger disk I/Os to look in the on-disk index, thus it is throughput sensitive. Container retrieval reads the relevant portion of the indicated container by invoking the container manager 1305. Container unpacking decompresses the retrieved portion of the container and returns the requested data segment.

The container manager 1305 provides a storage container log abstraction, not a block abstraction, to segment store 1303. A container includes a metadata section having the segment descriptors for the stored segments. They are immutable in that new containers can be appended and old containers deleted, but containers cannot be modified once written. When segment store manager 1303 appends a container, the container manager 1305 returns a container ID which is unique over the life of the system. The container manager 1305 is responsible for allocating, deallocating, reading, writing and reliably storing containers. It supports reads of the metadata section or a portion of the data section, but it only supports appends of whole containers. If a container is not full but needs to be written to disk, it is padded out to its full size. Container manager 1305 is built on top of standard block storage 1306. Advanced techniques such as software RAID-6, continuous data scrubbing, container verification, and end to end data checks are applied to ensure a high level of data integrity and reliability.

The container abstraction offers several benefits: 1) the fixed container size makes container allocation and deallocation easy; 2) the large granularity of a container write achieves high disk throughput utilization; and 3) a properly sized container size allows efficient full-stripe RAID writes, which enables an efficient software RAID implementation at the storage layer. According to one embodiment, certain components of system 1300, such as file service interface, include a logic configured to examine whether a particular request received could possibly compromise the integrity of an immutable data object and to request the necessary approval from an authorization agent for such a request, using the techniques set forth above. Other configurations may also exist.

Figure 14:
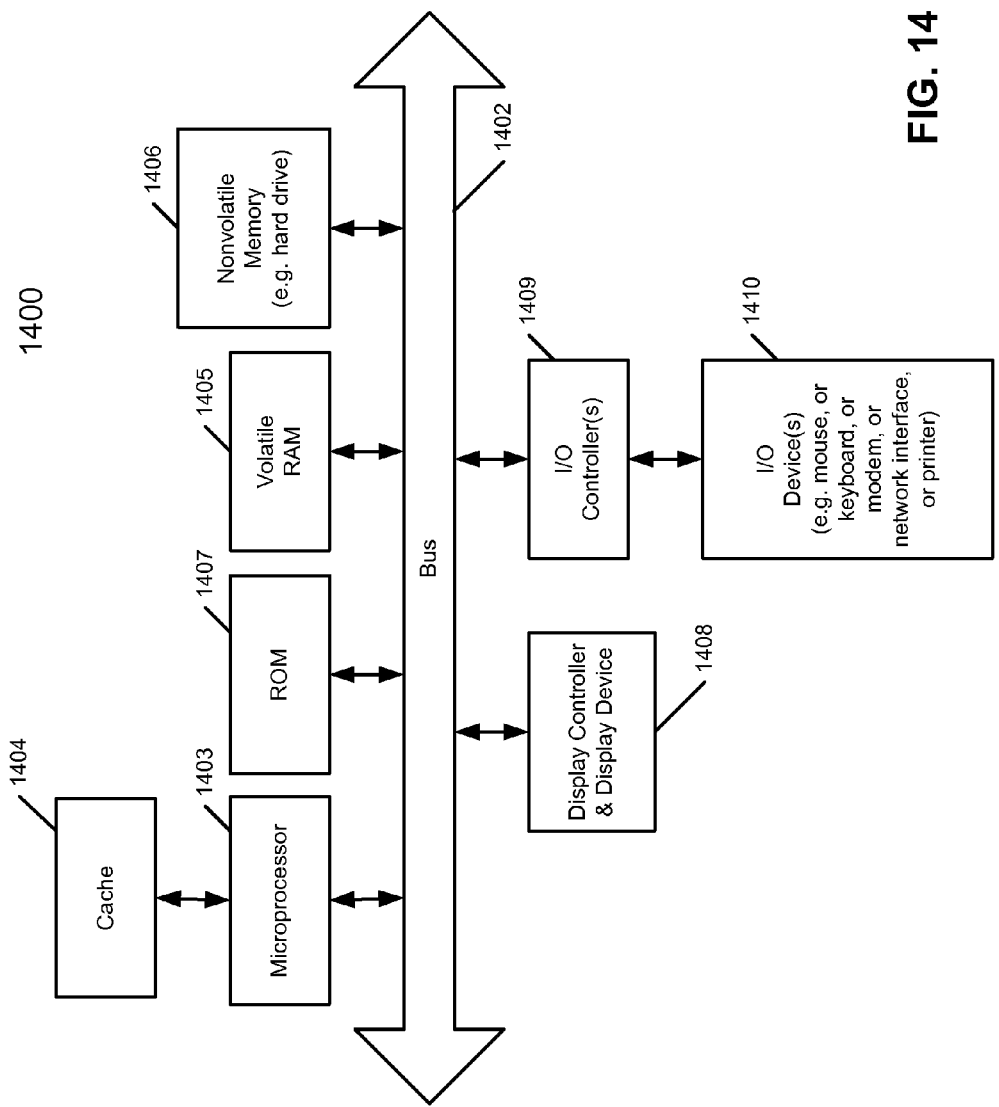
FIG. 14 is a block diagram of a data processing system which may be used with one embodiment of the invention.

FIG. 14 is a block diagram of a data processing system which may be used with one embodiment of the invention. For example, system 1400 may be used as a client or server computer as shown in FIG. 1. Note that while FIG. 14 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 14 may, for example, be an Apple Macintosh computer or an IBM compatible PC.

As shown in FIG. 14, the computer system 1400, which is in a form of a data processing system, includes a bus or interconnect 1402 coupled to a processor 1403 and a ROM 1407, a volatile RAM 1405, and a non-volatile memory 1406. Processor 1403 may include multiple processors and/or core logics that constitute central processing units (CPUs) of the system and thus, control the overall operations of the system. According to certain embodiments, processor 1403 accomplish this by executing software stored in any of the memories 1405-1407, such as, for example, applications and operating system, etc. Processor 1403 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 1403, which may be, for example, an Intel processor or a PowerPC processor, is coupled to cache memory 1404 as shown in the example of FIG. 14. The bus 1402 interconnects these various components together and also interconnects these components 1403 and 1405-1407 to a display controller and display device 1408, as well as to input/output (I/O) devices 1410, which may be mice, keyboards, modems, network interfaces, printers, and other devices which are well-known in the art.

Typically, the input/output devices 1410 are coupled to the system through input/output controllers 1409. The volatile RAM 1405 is typically implemented as dynamic RAM (DRAM) which requires power continuously in order to refresh or maintain the data in the memory. The non-volatile memory 1406 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 14 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1402 may include one or more buses connected to each other through various bridges, controllers, and/or adapters, as is well-known in the art. In one embodiment, the I/O controller 1409 includes a USB (Universal Serial Bus) adapter for controlling USB peripherals. Alternatively, I/O controller 1409 may include an IEEE-1394 adapter, also known as FireWire adapter, for controlling FireWire devices. Other components may also be included.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for maintaining a consistent point of a file system, the method comprising:
    receiving a request to write a first prime segment of a file system of a storage system, the storage system having a plurality of storage units that archive data from one or more clients;
    retrieving one or more storage unit identifiers from a prime segment write-map (PSWM), the one or more storage unit identifiers (IDs) identifying one or more of the storage units to which a new prime segment should be written, the storage unit IDs including a first storage unit ID identifying a first storage unit and a second storage unit ID identifying a second storage unit; and
    writing the first prime segment in the first storage unit and the second storage unit based on the first storage unit ID and second storage unit ID respectively, without writing the first prime segment to a remainder of the storage units, wherein the first prime segment is one of a plurality of prime segments collectively representing a prime, the prime containing metadata representing a consistent point of data stored in the file system, including a reference to a root of the file system, and wherein the first prime segment is utilized to restore the file system back to a state represented by the consistent point.

2. The method of claim 1, further comprising maintaining the PSWM within a segment storage engine of the storage system that is configured to segment a data file into a plurality of deduplicated segments before being stored in the storage system.

3. The method of claim 2, wherein each of the storage units is configured to store segments of data files, and wherein the segments are deduplicated within the respective storage unit.

4. The method of claim 1, wherein each of the storage units is configured to store data associated with one of a plurality of file system partitions.

5. The method of claim 4, wherein the file system partitions collectively represent a single logical file system of the storage system.

6. The method of claim 5, wherein each of the storage units maintains metadata having sufficient information to enable the corresponding file system partition to be self-identifiable and configurable.

7. The method of claim 6, wherein each file system partition can be individually started up and removed without having a major impact on operations of remaining file system partitions of the logical file system.

8. The method of claim 1, wherein the PSWM is stored in a persistent storage location of the storage system, and wherein in the event that the file system crashes, the PSWM is recovered from the last known installable prime during restart of the storage system.

9. A non-transitory machine-readable medium having instructions stored therein, which when executed by a processing system, cause the processing system to perform operations for maintaining a consistent point of a file system, the operations comprising:
    receiving a request to write a first prime segment of a file system of a storage system, the storage system having a plurality of storage units that archive data from one or more clients;
    retrieving one or more storage unit identifiers from a prime segment write-map (PSWM), the one or more storage unit identifiers (IDs) identifying one or more of the storage units to which a new prime segment should be written, the storage unit IDs including a first storage unit ID identifying a first storage unit and a second storage unit ID identifying a second storage unit; and
    writing the first prime segment in the first storage unit and the second storage unit based on the first storage unit ID and second storage unit ID respectively, without writing the first prime segment to a remainder of the storage units, wherein the first prime segment is one of a plurality of prime segments collectively representing a prime, the prime containing metadata representing a consistent point of data stored in the file system, including a reference to a root of the file system, and wherein the first prime segment is utilized to restore the file system back to a state represented by the consistent point.

10. The non-transitory machine-readable medium of claim 9, wherein the operations further comprise maintaining the PSWM within a segment storage engine of the storage system that is configured to segment a data file into a plurality of deduplicated segments before being stored in the storage system.

11. The non-transitory machine-readable medium of claim 10, wherein each of the storage units is configured to store segments of data files, and wherein the segments are deduplicated within the respective storage unit.

12. The non-transitory machine-readable medium of claim 9, wherein each of the storage units is configured to store data associated with one of a plurality of file system partitions.

13. The non-transitory machine-readable medium of claim 12, wherein the file system partitions collectively represent a single logical file system of the storage system.

14. The non-transitory machine-readable medium of claim 13, wherein each of the storage units maintains metadata having sufficient information to enable the corresponding file system partition to be self-identifiable and configurable.

15. The non-transitory machine-readable medium of claim 14, wherein each file system partition can be individually started up and removed without having a major impact on operations of remaining file system partitions of the logical file system.

16. The non-transitory machine-readable medium of claim 9, wherein the PSWM is stored in a persistent storage location of the storage system, and wherein in the event that the file system crashes, the PSWM is recovered from the last known installable prime during restart of the storage system.

17. A storage system, comprising:
    a processor;
    a memory;
    a plurality of storage units to store segments of data files of a file system;
    a prime segment write-map (PSWM) maintained by in the memory to store one or more storage unit identifiers (IDs) identifying one or more of the storage units to which a new prime segment should be written; and
    an archiver executed from the memory by the processor, in response to a request to write a first prime segment of the file system, configured to retrieve the one or more storage unit IDs from the PSWM, the storage unit IDs including a first storage unit ID identifying a first storage unit and a second storage unit ID identifying a second storage unit, and to write the first prime segment in the first storage unit and the second storage unit based on the first storage unit ID and second storage unit ID respectively, without writing the first prime segment to a remainder of the storage units, wherein the first prime segment is one of a plurality of prime segments collectively representing a prime, the prime containing metadata representing a consistent point of data stored in the file system, including a reference to a root of the file system, and wherein the first prime segment is utilized to restore the file system back to a state represented by the consistent point.

18. The system of claim 17, wherein the PSWM is maintained within a segment storage engine of the storage system that is configured to segment a data file into a plurality of deduplicated segments before being stored in the storage system.

19. The system of claim 18, wherein each of the storage units is configured to store segments of data files, and wherein the segments are deduplicated within the respective storage unit.

20. The system of claim 17, wherein each of the storage units is configured to store data associated with one of a plurality of file system partitions.

21. The system of claim 20, wherein the file system partitions collectively represent a single logical file system of the storage system.

22. The system of claim 21, wherein each of the storage units maintains metadata having sufficient information to enable the corresponding file system partition to be self-identifiable and configurable.

23. The system of claim 22, wherein each file system partition can be individually started up and removed without having a major impact on operations of remaining file system partitions of the logical file system.

24. The system of claim 17, wherein the PSWM is stored in a persistent storage location of the storage system, and wherein in the event that the file system crashes, the PSWM is recovered from the last known installable prime during restart of the storage system.

* * * * *